United States Patent Office 2,935,444
Patented May 3, 1960

2,935,444

PARASITICIDAL AGENT AND PROCESS FOR PRODUCING SAME

Louis G. Nickell, Port Washington, N.Y., Frank C. Pennington, Cedar Rapids, Iowa, and Isaiah A. Solomons, Garden City, N.Y., assignors to Chas. Pfizer & Co., Inc., Brooklyn, N.Y., a corporation of Delaware No Drawing. Application February 27, 1957
Serial No. 642,686

4 Claims. (Cl. 167—33)

This application is concerned with a new and useful compound called desacetylanisomycin, and more particularly, with a process for its production by converting the antibiotic anisomycin to the desired product by means of hydrolysis in the presence of a catalyst. This invention also includes within its scope the new compound in dilute form, as a crude concentrate, in pure crystalline form, and in the form of its salts, such as the hydrochloride, hydrobromide, hydroiodide, phosphate and citrate. These novel products are especially useful in combatting pathogenic micoorganisms infecting plants, and are particularly effective for inhibiting pathogenic fungi in plants.

In U.S. Patent No. 2,691,618 there is described the production of anisomycin by fermentation, as well as the use of this product in combatting pathogenic microorganisms, such as fungi and protozoa.

It has now been discovered that desacetylanisomycin, i.e., 2 - ($\alpha$ - hydroxy - p - methoxybenzyl) - 4 -hydroxy-pyrrolidine, is useful in combatting obligate parasites responsible for mildew and rusts in commercially important plants such as beans and apples. In particular, it affords very good control of bean rust when applied as a foliar spray and it is also effective in eradicating bean mildew when applied to the soil. It should be noted at this point that these results are particularly surprising in view of the fact that desacetylanisomycin has no antifungal activities in vitro. Desacetylanisomycin can be applied in several ways; for example, it can be dissolved in an organic solvent such as acetone, or its acid salts can be dissolved in an aqueous solution, or it can be incorporated into a fertilizer, or merely mixed with an inert dust such as talcum powder; it may also contain a stabilizing agent such as sodium dibutylnaphthalenesulfonate.

The successful treatment of obligate parasites is an extremely complex problem in view of the fact that these particular parasites will only grow on specific living hosts and will not grow under any other conditions. They are often so specific in their genetic requirements that they will grow only on plants of a particular species. In view of the fact that they must exist on living hosts during their life cycle, it appears they have lost many of their biosynthetic capacities and are directly dependent upon living cells to furnish these deficiencies. In other words, the metabolic processes which are necessary to the life of the plant are also necessary to the life of the parasite. It necessarily follows that an agent which is capable of killing the parasite, such as a fungus, is also potentially capable of killing the plant. The obligate parasiticide interferes with its metabolic pathways and/or pathways of the parasite which may also be common to the host. In this instance, the parasiticide must be so specific in its action that it does not interfere with the metabolism of the host to such an extent as to be fatal. Furthermore, it is necessary to carry out all testing in vivo since the organism will not grow in an artificial medium. Anisomycin compositions are also effective both in preventing rust and in preventing mildews which attack plants. However, when they are used at the concentration level at which obligate parasiticides are usually effective, that is, in the range of 400–2000 parts per million by weight, anisomycin compositions are often phytotoxic. It is interesting to note that desacetylanisomycin does not possess this degree of phytotoxicity under the same conditions. When these facts are considered, it is apparent that the discovery of this new product is both unexpected and a most important contribution to the art.

Desacetylanisomycin gives very good control of bean rust when sprayed in concentrations in the range of 400 parts per million and 2000 parts per million for eradicant action. The plants used for this test were inoculated 24 hours before they were sprayed with desacetylanisomycin. It was found that the rust of Pinto beans was completely eradicated after the plant had been sprayed with desacetylanisomycin at two different concentrations. It was 96% effective at a concentration level of 400 parts per million and 99% effective at a concentration level of 2000 parts per million. No injury to the plants could be observed, and the new foliage which appeared after treatment with desacetylanisomycin solution was completely free of infection. On the other hand, infection in the controls had increased and the new foliage which appeared in the controls was also infected.

In addition, the chemotherapeutic activity of desacetylanisomycin when applied to the soil for the control of bean rust has also been determined. Two soil tests were made to determine the systemic activity by applying a dosage of 100 mg./4" pot, each pot containing two Pinto bean plants. Spot counts were made and the individual leaves were rated on each of three replicate pots. In this instance, the effectiveness of desacetylanisomycin was found to be 53%.

Desacetylanisomycin has been found to possess a relatively low level of toxicity when used in plants. For example, no evidence of toxicity has been noted in the routine screening against plant pathogens when the compound is administered to the plants as a soil application or as a spray application to foliage.

Desacetylanisomycin is formed by subjecting anisomycin in an aqueous medium to the action of an alkaline catalyst at atmospheric pressure and at slightly elevated temperatures. The catalysts most generally used are alkaline materials selected from the group consisting of alkaline earth and alkali metal hydroxides, e.g., sodium hydroxide, potassium hydroxide, barium hydroxide, calcium hydroxide, as well as alkali carbonates and alkali bicarbonates. Low concentrations of alkali may be employed as the hydroxyl ion catalyzes the reaction. However, in view of the fact that one of the products of the reaction is an acid which reacts immediately with the basic catalyst, the desired product can be conveniently recovered from the reaction mixture in a pure form if an excess of alkali is employed; this in turn, affords excellent yields of desacetylanisomycin.

The alkaline catalyst is employed in an amount sufficient to form the corresponding salt of acetic acid. An additional amount of the alkaline material is employed to maintain the reaction mixture under alkaline conditions throughout the hydrolysis. In general, a total amount of alkaline material in the range of from about 1.5 to 7.5 equivalents to one equivalent of anisomycin is useful. A total amount of about five equivalents of the alkaline material per equivalent of the anisomycin is preferred. Thus, in the case of sodium hydroxide, a ratio of about five moles of sodium hydroxide to one mole of anisomycin is employed for optimum results.

The hydrolysis is carried out within the temperature range of 50–100° C. at atmospheric pressure. The preferred temperature is that near the boiling point of the reaction mixture. It is, therefore, most convenient to heat the reaction mixture under reflux. The time of the reaction may vary considerably, depending upon the reaction conditions, etc., but in general, from about 0.5 to 4 hours is sufficient to complete the reaction.

Upon completion of the hydrolysis, the reaction mixture is filtered while hot, and the filtrate upon cooling subsequently deposits long, colorless needles of desacetylanisomycin; these needles are collected on a funnel, washed with water and dried. Its purity is such that recrystallization of this product from different solvents did not give a better sample.

Desacetylanisomycin is a basic, colorless organic compound that is soluble in a number of organic solvents, such as methyl alcohol, dioxane, acetone and chloroform. It is insoluble in hexane, cyclohexane, carbon tetrachloride and ether. The crystalline compound possesses the following physical properties: M.P. 176–179° C.; $[\alpha]_D^{25°}$ —20° (C, 1%; methanol); its pK is 9.2, and its neutralization equivalent is 223. The ultraviolet absorption spectrum of this compound is very similar to that of anisomycin; it exhibits absorption maxima at 224, 277 and 283 m$\mu$, wherein the molar absorptivities ($e_{max}$) are 9,900, 1,680 and 1,417, respectively. Therefore, desacetylanisomycin is clearly distinguished from other compounds by its properties.

Furthermore, useful salts of this compound can be prepared by methods well known in the art, such as treatment of the base with the appropriate acid in aqueous solution or under anhydrous conditions. In the case of the hydrochloride, the base is dissolved in acetone or other stable solvents and hydrogen chloride gas is passed into the solution. Other acids, such as sulphuric acid, phosphoric acid, citric acid, etc., may be used to prepare other acid salts of desacetylanisomycin.

The structure of desacetylanisomycin has been demonstrated by degradation studies and shown to be 2-($\alpha$-hydroxy-p-methoxybenzyl)-4-hydroxypyrrolidine. It may be synthesized from commercially available starting materials by either of the two following methods:

(a) Starting from 4-hydroxyproline:

This process comprises reacting 4-hydroxyproline with carbobenzoxyl chloride, treatment of the resulting intermediate with thionyl chloride and then reacting the intermediate acid chloride with p-methoxyphenyl cadmium bromide. This is followed by reduction with aluminum isopropoxide and finally removal of the carbobenzoxy groups by means of catalytic hydrogenation.

(b) Starting with p-methoxyacetophenone:

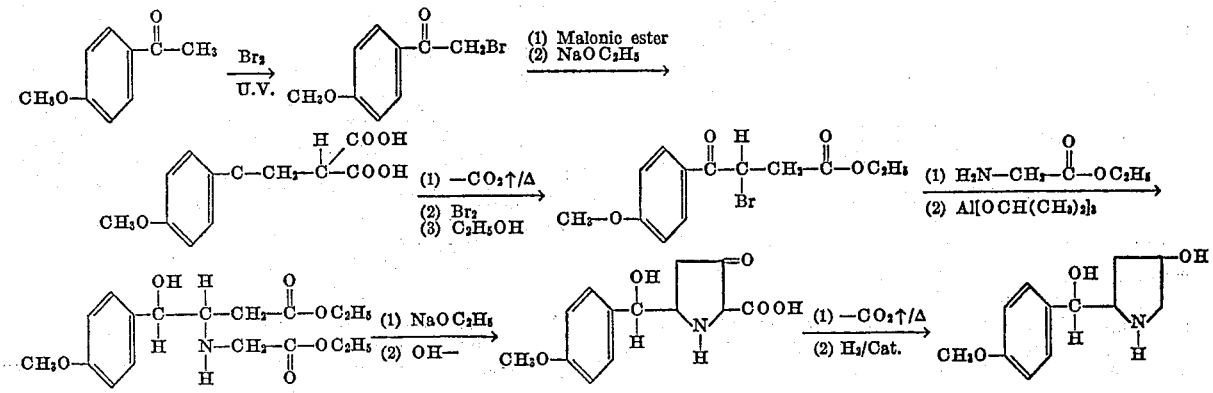

This process comprises brominating p-methoxyacetophenone under the influence of ultraviolet light, treatment of the resulting monobromo intermediate with sodio malonic ester, followed by hydrolysis and decarboxylation to the corresponding monocarboxylic acid. The latter compound is then brominated and esterified to form the $\beta$-bromo ester which is then reacted with the ethyl ester of glycine to afford a ketone that can be subsequently reduced to a secondary alcohol. This intermediate is then cyclized to a pyrrolidone which is easily decarboxylated; reduction of the latter affords the desired product.

The invention is further illustrated by the following examples, which are not to be considered as imposing any limitation thereon.

*Example I*

A mixture of 5.0 g. (0.0188 mole) of anisomycin and 125 ml. of 1 N sodium hydroxide was boiled under reflux for 2.25 hours and filtered while hot. On cooling, long colorless needles of desacetylanisomycin crystallized out and these were collected, washed with a small amount of cold water and dried. The product weighed 3.2 g. (76%) and melted at 176–179° C.; $[\alpha]_D^{25°}$ —20° (C, 1%; methanol).

*Analysis.*—Calcd. for $C_{12}H_{17}O_3N$: C, 64.55; H, 7.67; N, 6.27; $CH_3O$, 13.90. Found: C, 64.43; H, 7.69; N, 6.21; $CH_3O$, 14.01.

*Example II*

Desacetylanisomycin is dissolved in acetone and hydrogen chloride gas is passed into the resulting solution. The product crystallized out, affording a quantitative yield of desacetylanisomycin hydrochloride. In a similar

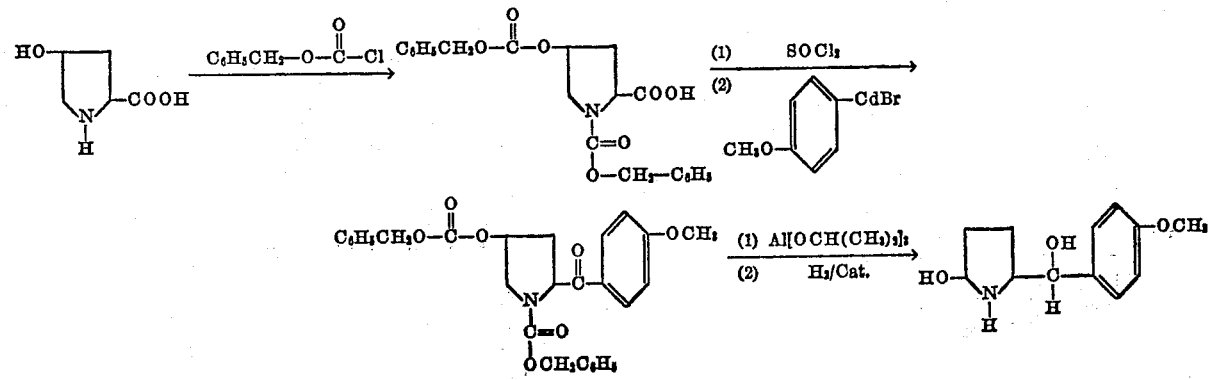

manner, the hydrobromide and hydroiodide of desacetylanisomycin was obtained by contacting a solution of the base with hydrogen bromide and hydrogen iodide gas, respectively.

These same salts were also obtained by contacting the base in an aqueous medium with the respective hydrohalide acids. The phosphate and citrate of desacetylanisomycin were obtained in a similar manner, from phosphoric acid and citric acid, respectively.

*Example III*

To a mixture containing 100 g. of pulverized calcium carbonate, 2 g. of triolein and 1 g. of calcium hydroxide was added sufficient desacetylanisomycin hydrochloride to give a mixture containing 400 parts per million of desacetylanisomycin; the mixture was then ground in a ball mill, and the resulting powder, which can easily be scattered, is effective against obligate parasites.

*Example IV*

A mixture of 5 mg. of desacetylanisomycin, 25 g. of talcum powder, 4 g. of sodium dibutyl naphthalenesulfonate, 4 g. of casein and 5 g. of sodium carbonate was ground together in a ball mill. The resulting mixture was added to an equal quantity of ground calcium carbonate and the whole thoroughly mixed. This powder may be suspended in water immediately before use and gives an obligate parasiticidal suspension which is sufficiently stable for use in spraying plants.

*Example V*

Desacetylanisomycin hydrochloride was dissolved in water containing 5% acetone to give a solution having 200 parts per million by weight of desacetylanisomycin hydrochloride. This solution was used as a spray and found to be an effective parasiticide.

*Example VI*

A solution is prepared containing 10 mg. of desacetylanisomycin in 100 g. of carbon tetrachloride. This solution is useful as an obligate parasiticide in spraying applications.

*Example VII*

A solution containing 15 mg. of desacetylanisomycin, 4 g. of acetone and 160 g. of Freon–12 is prepared and used as an obligate parasiticidal agent in an aerosol form.

*Example VIII*

A solution is prepared containing 20 mg. of desacetylanisomycin and 5 g. of D.D.T. in 90 g. of kerosene. This solution is useful as a spray for the eradication of bean mildew in plants.

Thus, this inveniton provides an economical and efficient process for preparing desacetylanisomycin. The product so obtained is useful as a new obligate parasiticide, effective in inhibiting pathogenic fungi in plants, without the disadvantages which attend the prior art.

What is claimed is:

1. A process for inhibiting pathogenic fungi in plants, which comprises applying a substance chosen from the group consisting of 2-(α-hydroxy-p-methoxybenzyl)-4-hydroxypyrrolidine and acid salts thereof to said plants.

2. 2 - (α - hydroxy - p - methoxybenzyl) - 4 - hydroxypyrrolidine.

3. An acid addition salt of 2-(α-hydroxy-p-methoxybenzyl)-4-hydroxypyrrolidine which is chosen from the group consisting of the hydrochloride, hydrobromide, hydroiodide, phosphate, and citrate.

4. A composition for inhibiting pathogenic fungi in plants, which consists essentially of from 0.001% to 15% of 2-(α-hydroxy-p-methoxybenzyl)-4-hydroxypyrrolidine and an agriculturally acceptable carrier.

References Cited in the file of this patent

UNITED STATES PATENTS

| | | |
|---|---|---|
| 2,112,329 | Braun | Mar. 29, 1938 |
| 2,418,655 | Michelman | Apr. 8, 1947 |
| 2,555,330 | Gates | June 5, 1951 |
| 2,689,854 | Tanner et al. | Sept. 21, 1954 |
| 2,691,618 | Tanner et al. | Oct. 12, 1954 |
| 2,725,399 | Denton | Nov. 29, 1955 |
| 2,726,981 | Wolf | Dec. 13, 1955 |
| 2,752,359 | Celmer | June 26, 1956 |
| 2,851,463 | Hinman et al. | Sept. 9, 1958 |

OTHER REFERENCES

Lowy et al.: Introduction of Organic Chemistry, Sixth Edition, page 114 (1945).

UNITED STATES PATENT OFFICE
CERTIFICATE OF CORRECTION

Patent No. 2,935,444                           May 3, 1960

Louis G. Nickell et al.

It is hereby certified that error appears in the printed specification of the above numbered patent requiring correction and that the said Letters Patent should read as corrected below.

Column 3, in the second line of the three lines of equations that immediately follow line 8 of the patent, in the first structural formula, a keto group should be attached to the carbon immediately to the right of the hexagon, as shown below:

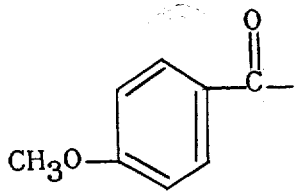

column 4, in the very last structural formula at the end of the column, the first (pentagonal) ring should appear as shown below instead of as in the patent:

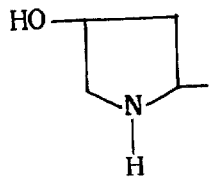

Signed and sealed this 22nd day of November 1960.

(SEAL)
Attest:

KARL H. AXLINE
Attesting Officer

ROBERT C. WATSON
Commissioner of Patents